United States Patent
Günther et al.

(10) Patent No.: US 11,293,800 B2
(45) Date of Patent: Apr. 5, 2022

(54) METHOD FOR CORRECTING A PRIMARY MEASUREMENT SIGNAL DETECTED BY AN OPTICAL SENSOR

(71) Applicant: Endress+Hauser Conducta GmbH+Co. KG, Gerlingen (DE)

(72) Inventors: Hermann Günther, Dresden (DE); Ronny Michael, Erlau (DE); Stefan Paul, Döbeln (DE)

(*) Notice: Subject to any disclaimer, the term of this patent is extended or adjusted under 35 U.S.C. 154(b) by 0 days.

(21) Appl. No.: 16/894,007

(22) Filed: Jun. 5, 2020

(65) Prior Publication Data

US 2020/0386615 A1   Dec. 10, 2020

(30) Foreign Application Priority Data

Jun. 7, 2019 (DE) .................. 10 2019 115 603.3

(51) Int. Cl.
*G01J 1/42* (2006.01)
*G01N 21/59* (2006.01)

(52) U.S. Cl.
CPC ............ *G01J 1/4228* (2013.01); *G01N 21/59* (2013.01)

(58) Field of Classification Search
CPC .......... G01J 1/4228; G01J 3/42; G01N 21/59; G01N 21/6428; G01N 21/6408; G01N 21/1702; G01N 21/95607; G01N 21/3504; G01N 21/553; G01N 2021/1704; G01N 2021/6432

USPC ................ 356/432–440, 73; 422/68.1, 82.05
See application file for complete search history.

(56) References Cited

U.S. PATENT DOCUMENTS

| | | | |
|---|---|---|---|
| 5,491,095 A | 2/1996 | Bepko et al. | |
| 5,679,584 A | 10/1997 | Mileaf et al. | |
| 10,585,018 B2* | 3/2020 | Willing | F02D 41/22 |
| 2021/0164903 A1* | 6/2021 | Zeun | G01K 13/00 |

FOREIGN PATENT DOCUMENTS

DE    3837903 A1    5/1989

* cited by examiner

*Primary Examiner* — Hoa Q Pham
(74) *Attorney, Agent, or Firm* — Christopher R. Powers; Endress+Hauser (USA) Holding Inc.

(57) ABSTRACT

The present disclosure includes a method for correcting a primary measurement signal detected by an optical detector. The method includes: emitting a first light signal from a light source to an active sensor layer such that the active sensor layer is stimulated and emits a second light signal, which is detected by an optical detector; determining the primary measurement signal of a primary measurement parameter based on the second light signal and/or the first light signal; determining a secondary measurement signal of a secondary measurement parameter that is different from the primary measurement parameter based on the first light signal or the second light signal; comparing the determined secondary measurement signal with a first limit value; and correcting the primary measurement signal when the secondary measurement signal exceeds the first limit value, wherein correcting the primary measurement signal comprises smoothing the primary measurement signal by filtering.

14 Claims, 2 Drawing Sheets

METHOD FOR CORRECTING A PRIMARY MEASUREMENT SIGNAL DETECTED BY AN OPTICAL SENSOR

CROSS-REFERENCE TO RELATED APPLICATION

The present application is related to and claims the priority benefit of German Patent Application No. 10 2019 115 603.3, filed on Jun. 7, 2019, the entire contents of which are incorporated herein by reference.

TECHNICAL FIELD

The present disclosure relates to a method for correcting a primary measurement signal detected by an optical sensor.

BACKGROUND

In the field of process analysis, optical sensors are used to monitor chemical processes, for example in a fermenter. Oxygen, among other things, is introduced into a fermenter to control bacterial growth in the fermenter. This is done by means of the constant introduction of a gas. When the gas is introduced, the gas bubbles usually move past the optical sensor.

A widespread problem in the measurement of various process parameters, such as the dissolved oxygen or electrical conductivity of a medium, by means of an optical sensor is the influence of gas bubbles on the optical sensor. For example, individual gas bubbles may temporarily settle on the optical sensor and thereby hinder the correct and continuous measurement of the process parameter. The gas bubbles prevent contact between the optical sensor and the liquid medium. The measurement signals measured by the optical sensor thus change abruptly when the gas bubbles settle and detach from the sensor. The gas bubbles thus lead to a disturbance in regulation of the fermentation process used as an example.

SUMMARY

It is therefore an object of the present disclosure to provide a method which allows disturbances in the regulation of processes to be minimized by means of an optical sensor.

This object is achieved by a method according to the present disclosure.

The method according to the present disclosure is a method for correcting a primary measurement signal detected by an optical detector. The method comprises at least the following steps:

Providing an optical measuring device having a light source, an active sensor layer, an optical detector and a control unit, wherein the control unit is connected to the light source and the optical detector, Emitting a first light signal from the light source to the active sensor layer so that the active sensor layer is stimulated and a second light signal is emitted to the optical detector, Detecting the second light signal emitted by the active sensor layer by means of the optical detector, Determining the primary measurement signal of a primary measurement parameter by means of the control unit based on the first light signal and the second light signal or based on the first light signal, Determining a secondary measurement signal by means of the control unit of a secondary measurement parameter that is different from the primary measurement parameter based on the first light signal or the second light signal, Comparing the determined secondary measurement signal with a first limit value by means of the control unit, Correcting the primary measurement signal by means of the control unit if the secondary measurement signal exceeds the first limit value, wherein correcting the primary measurement signal comprises filtering the primary measurement signal so that the primary measurement signal is smoothed.

The method according to the present disclosure enables interfering gas bubbles at the optical sensor to be detected in a simple and reliable manner. A measurement by an optical sensor that has been disturbed by gas bubbles can be efficiently corrected. The measured values of the optical sensor thus become more accurate.

In one embodiment of the present disclosure, the primary measurement parameter is a phase angle between the first light signal and the second light signal.

In one embodiment of the present disclosure, the secondary measurement signal is an intensity signal of the second light signal.

In one embodiment of the present disclosure, the secondary measurement signal is a drive current of the light source for generating the emitted first light signal.

In one embodiment of the present disclosure, the step of correcting the primary measurement signal comprises filtering the primary measurement signal with a moving average filter, an infinite impulse response filter or a final impulse response filter.

In one embodiment of the present disclosure, the first limit value is a specified deviation from an average of the secondary signal.

In one embodiment of the present disclosure, the average is a moving average and the specified deviation is a fraction of the average.

This object is further achieved by a device according to the present disclosure.

The optical measuring device according to the present disclosure for correcting a primary measurement signal detected by an optical detector comprises:

A light source, an active sensor layer, an optical detector and a control unit, wherein the control unit is connected to the light source and to the optical detector, wherein the optical detector, the active sensor layer and the light source are arranged such that a first light signal emitted by the light source is received by the active sensor layer and a second light signal emitted by the active sensor layer is received by the optical detector, wherein the control unit is adapted to determine a primary measurement signal of a primary measurement parameter based on the emitted first light signal and the detected second light signal or based on the first light signal, wherein the control unit is adapted to determine a secondary measurement signal of a secondary measurement parameter that is different from the primary measurement parameter based on the first light signal, wherein the control unit is adapted to compare the determined secondary measurement signal with a first limit value, wherein the control unit is adapted to correct the determined primary measurement signal by means of filtering if the secondary measurement signal exceeds the first limit value, so that the primary measurement signal is smoothed.

BRIEF DESCRIPTION OF THE DRAWINGS

The present disclosure is explained in more detail on the basis of the following description of the figures.

DETAILED DESCRIPTION

Figure 1:
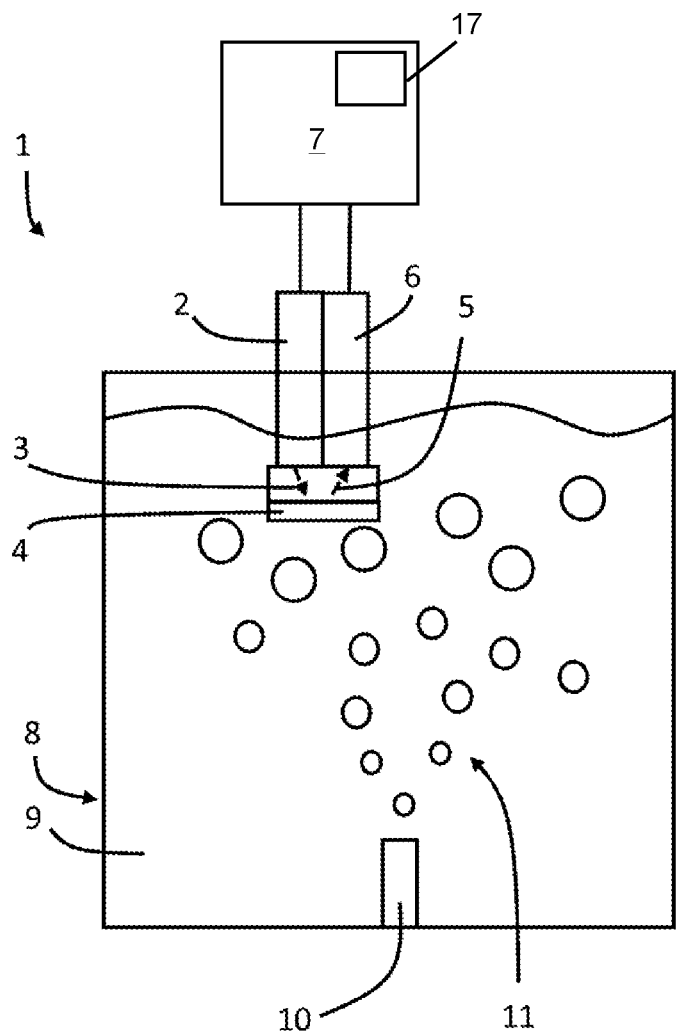
FIG. 1 shows a schematic representation of the optical measuring device according to the present disclosure, which is being influenced by gas bubbles.

FIG. 1 shows a schematic representation of an optical measuring device 1 with a light source 2, an active sensor layer 4, an optical detector 6 and a control unit 7.

The optical measuring device 1 is arranged in a process container 8 in which a process medium 9 is located in such a way that the optical measuring device 1 is in contact with the process medium 9. More precisely, the optical measuring device 1 is arranged in the process container 8 in such a way that the active sensor layer 4 is in contact with the process medium 9. The measuring device 1 is adapted to measure a measured value of a measurement parameter, e.g., a concentration of an analyte in the process medium 9.

The light source 2 is adapted to emit a first light signal 3. The light source 2 is arranged such that the first light signal 3 strikes the active sensor layer 4. When stimulated by a light signal, the active sensor layer 4 is adapted to emit a second light signal 5. The optical detector 6 is adapted to detect a light signal. The optical detector 6 is arranged in such a way that the second light signal 5 emitted by the active sensor layer 4 strikes the optical detector 6. The control unit 7 is adapted to control the light source 2 to emit the first light signal 3. The control unit 7 is adapted to control the light source 2 as it emits the first light signal 3 as a function of the second light signal 5 detected by the optical detector 6.

A gas source 10 is arranged in the process container 8 for introducing gas into the process medium 9. The gas source 10 is arranged in such a way that when gas bubbles 11 are introduced, the gas bubbles 11 pass the active sensor layer 4. Specifically, the gas bubbles 11 come into contact with the active sensor layer 4. The gas can be, for example, nitrogen or air.

Figure 2:
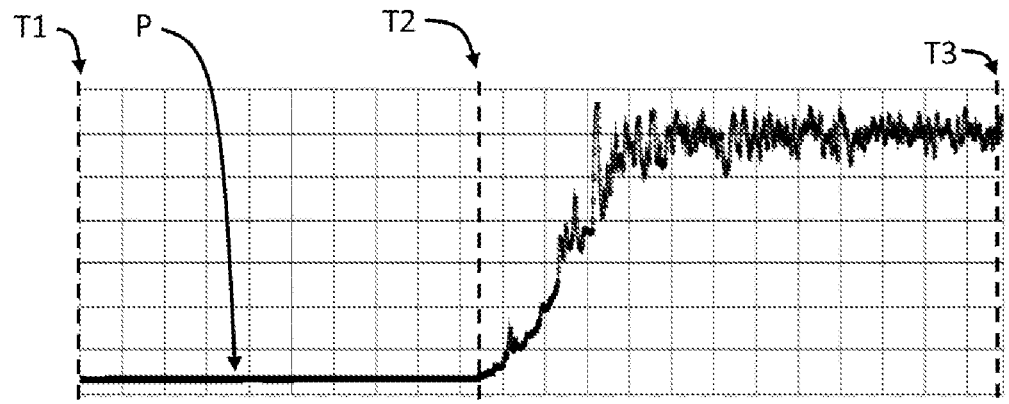
FIG. 2 shows a diagram of the phase angle between a first light signal emitted by a light source and a second light signal detected by a detector.

The method for correcting a primary measurement signal P detected by the optical detector 6 will be described below. FIG. 2 shows the primary measurement signal P, the measurement parameter of which is a phase angle between the first light signal 3 and the second light signal 5. The primary measurement signal P is used to determine an analyte content of the process medium 9.

The light source 2 can be, for example, an LED and emits the first light signal 3 in the direction of the active sensor layer 4. The active sensor layer 4 is stimulated by the first light signal 3 to emit the second light signal 5. The second light signal 5 is detected by the optical detector 6. The gas bubbles 11 are emitted by the gas source 10 in such a way that they travel past the optical measuring device 1, more precisely past the active sensor layer 4 and touch and/or adhere thereto. This influences the emission of the second light signal 5 of the active sensor layer 4. The presence of gas bubbles thus influences the second light signal 5.

The control unit 7 controls the light source 2 as it emits the first light signal 3 and evaluates the second light signal 5 detected by the optical detector 6.

Figure 3:
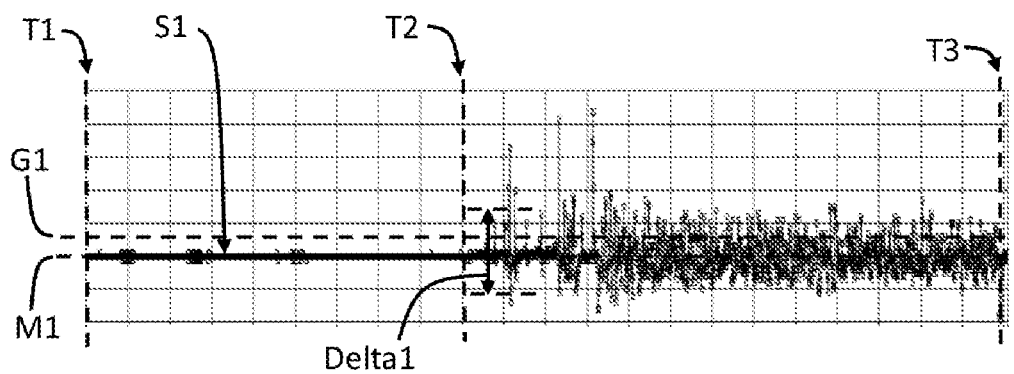
FIG. 3 shows a diagram of the intensity of a detected light signal.
Figure 4:
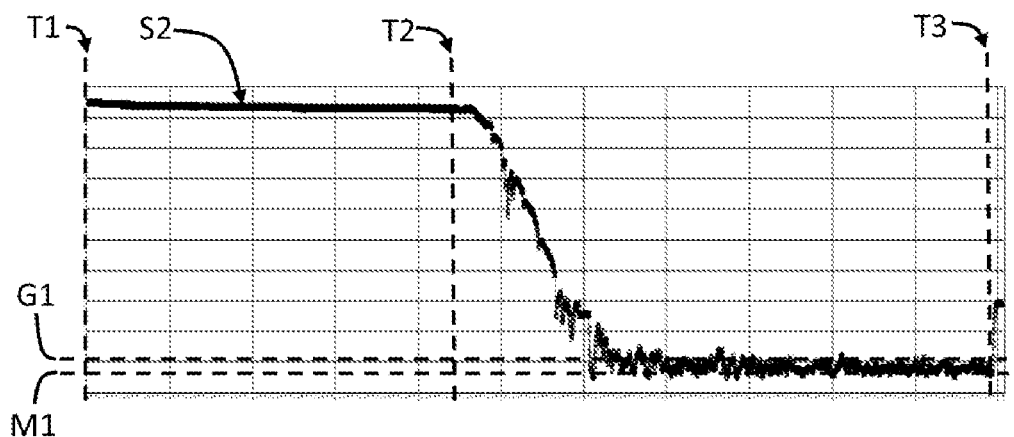
FIG. 4 shows a diagram of the drive current of a light source.

The control unit 7 controls the light source 2 in such a way that the intensity of the first light signal 3 is adjusted to the second light signal 5 detected by the optical detector 6. This means that the control unit 7 regulates the light source 2 in such a way that the detected second light signal 5 remains as constant as possible. FIG. 3 shows the second light signal 5 detected by the optical detector 6. FIG. 4 shows a drive current by which the light source 2 is activated to emit the first light signal 3. If the active sensor layer 4 is not disturbed by gas bubbles 11, which is the case between times T1 and T2, the detected second light signal 5 and the drive current for generating the first light signal 3 are virtually constant. If the active sensor layer 4 is disturbed by gas bubbles 11, which is the case between times T2 and T3, the emission of the second light signal 5 is changed by the active sensor layer. The second light signal 5 detected by the optical detector 6 likewise changes, as shown in FIG. 3. The control unit 7 responds to the change in the detected second light signal 5 with a change in the drive current of the light source 2, as shown in FIG. 4.

After the optical detector 6 has detected the second light signal 5, the control unit 7 determines a primary measurement signal P of the primary measurement parameter based on the drive current used for emission of the first light signal 3 and the detected second light signal 5 (see FIG. 2). The primary measurement signal P is determined by the control unit 7 based on the emitted first light signal 3, e.g., the drive current used by the light source 2 to generate the first light signal 3, and the detected second light signal 5. The primary measurement signal P represents, for example, a phase angle between the first light signal 3 emitted by the light source 2 and the second light signal 5 detected by the optical detector 6. In this context, the term "phase angle" is understood to mean the displacement of the first light signal 3 relative to the second light signal 5.

The primary measurement signal P can also be determined by the control unit 7 based on the emitted first light signal 3 or the drive current of the light source 2 or based on the detected second light signal 5 and the drive current.

The control unit 7 then determines a secondary measurement signal S1, S2 of a secondary measurement parameter that is different from the primary measurement parameter. The secondary measurement signal can be, for example, an intensity signal S1 of the second light signal 5 detected by the optical detector 6 (see FIG. 3).

In an alternative variation, the secondary measurement signal is a drive current S2 of the light source 2 for generating the emitted first light signal 3 (see FIG. 4). As described above, the drive current S2 is controlled by the control unit 7 based on the detected second light signal 5.

Next, the control unit 7 compares the determined secondary measurement signal S1, S2 with a limit value G1.

The first limit value G1 can be, for example, a specified deviation Delta1 from an average value M1 of the secondary signal S1, S2. The average value M1 can be, for example, a moving average. That is, in this case the average value M1 is continuously recalculated during measurement by the optical measuring device 1. The specified deviation Delta1 can be, for example, a fraction of the average value M1.

If the secondary measurement signal S1 passes the first limit value G1, the primary measurement signal P is corrected by the control unit 7. The correction of the primary measurement signal P is based on a filtering of the primary measurement signal P.

For example, the primary measurement signal P is filtered with a moving average filter 17, an infinite impulse response filter or a final impulse response filter. This makes it possible to correct the primary measurement signal P only when a correction is actually necessary. In this way, delays between the time of measurement and the time of display of the current measured value are minimized. The correction of the primary measurement signal makes it possible to determine a smoothed measured value.

FIG. 2 shows an exemplary primary measurement signal P with water as process medium 9. The primary measurement signal P is based on the first light signal 3 and the second light signal 5. In the example of FIG. 2, the primary measurement signal P is the phase angle between the first light signal 3 and the second light signal 5. Between a first point in time T1 and a second point in time T2, the primary measurement signal P remains constant. Between the second point in time T2 and a third point in time T3, the active sensor layer 4 is influenced by rising gas bubbles, in this example nitrogen bubbles.

As a result of the gas bubbles 11 which pass by the active sensor layer 4 or temporarily adhere to the active sensor layer 4, the emission of the second light signal 5 is influenced by the active sensor layer 4. This influence is manifested by measurement fluctuations starting from the second point in time T2.

The water becomes enriched with nitrogen by the nitrogen gas bubbles. This can be seen by the increasing primary measurement signal, the phase angle. At a point in time between T2 and T3, the water is saturated with nitrogen, which is why the phase angle does not increase further.

FIG. 3 shows an exemplary secondary signal, more precisely an exemplary intensity signal S1 of the second light signal 5. The first limit value G1 is a fraction of the first average value M1 of the intensity signal S1. The limit value G1 can be selected in dependence on the measuring point 10 used. The limit value G1 can also be selected as a function of a signal fluctuation of the intensity signal S1. This means that the fluctuation range of the intensity signal S1 is determined during a period in which no gas bubbles influence the optical measuring device 1. The limit value G1 is then determined as a multiple of, for example double, the maximum fluctuation range of the intensity signal S1.

FIG. 4 shows an exemplary alternative secondary signal, more precisely an exemplary drive current S2 of the light source 2. Since the first light signal 3 emitted by the light source 2 is controlled as a function of the second light signal 5 detected by the optical detector 6, the emitted first light signal 3 also changes upon a change in the detected second light signal 5. In the case shown in FIGS. 2-4, the active sensor layer 4 emits a stronger second light signal 5 when nitrogen is detected. Thus, the control unit 7 regulates the light source 2 in such a way that a lower first light signal 3 is emitted in response to lower stimulation of the active sensor layer 4.

The correction method makes it possible to smooth the primary measurement signal P only when smoothing is actually necessary, when the optical measuring device is influenced by gas bubbles. The correction method thus allows the optimal display of the primary measurement signal P and can easily be read off by the user.

The invention claimed is:

1. A method for correcting a primary measurement signal detected by an optical detector, the method comprising:
providing an optical measuring device including a light source, an active sensor layer, an optical detector and a controller, wherein the controller is in communication with the light source and the optical detector;
emitting a first light signal from the light source, the first light signal directed toward the active sensor layer such that the active sensor layer is stimulated and emits a second light signal, which is directed toward the optical detector;
detecting the second light signal emitted by the active sensor layer using the optical detector;
determining the primary measurement signal of a primary measurement parameter using the controller based on the first light signal or based on the first light signal and second light signal;
determining a secondary measurement signal of a secondary measurement parameter using the controller based on the first light signal or the second light signal, wherein secondary measurement parameter different from the primary measurement parameter;
comparing the determined secondary measurement signal with a first limit value using the controller;
correcting the primary measurement signal using the controller when the secondary measurement signal exceeds the first limit value, wherein correcting the primary measurement signal comprises filtering the primary measurement signal such that the primary measurement signal is smoothed.

2. The method of claim 1, wherein the primary measurement parameter is a phase angle between the first light signal and the second light signal.

3. The method of claim 1, wherein the secondary measurement signal is an intensity signal of the second light signal.

4. The method of claim 1, wherein the secondary measurement signal is a drive current of the light source for generating the emitted first light signal.

5. The method of claim 1, wherein correcting the primary measurement signal comprises filtering the primary measurement signal with a moving average filter, an infinite impulse response filter or a final impulse response filter.

6. The method of claim 1, wherein the first limit value is a specified deviation from an average value of the secondary measurement signal.

7. The method of claim 6, wherein the average value is a moving average and the specified deviation is a fraction of the average value.

8. An optical measuring device for correcting a primary measurement signal detected by an optical detector, the device comprising:
a light source;
an active sensor layer;
an optical detector, wherein the optical detector, the active sensor layer and the light source are arranged such that a first light signal emitted by the light source is incident upon the active sensor layer, and a second light signal emitted by the active sensor layer in response to the first light signal is received by the optical detector; and
a controller in communication with the light source and the optical detector, wherein the controller is configured to:
determine a primary measurement signal of a primary measurement parameter based on the emitted first light signal or based on the emitted first light signal and the detected second light signal;
determine a secondary measurement signal of a secondary measurement parameter based on the first light signal or the second light signal, wherein the secondary measurement parameter is different from the primary measurement parameter;

compare the determined secondary measurement signal with a first limit value; and correct the determined primary measurement signal by filtering when the secondary measurement signal exceeds the first limit value such that the primary measurement signal is smoothed.

9. The device of claim 8, wherein the primary measurement parameter is a phase angle between the first light signal and the second light signal.

10. The device of claim 8, wherein the secondary measurement signal is an intensity signal of the second light signal.

11. The device of claim 8, wherein the secondary measurement signal is a drive current of the light source for generating the emitted first light signal.

12. The device of claim 8, wherein correcting the primary measurement signal comprises filtering the primary measurement signal with a moving average filter, an infinite impulse response filter or a final impulse response filter.

13. The device of claim 8, wherein the first limit value is a specified deviation from an average value of the secondary measurement signal.

14. The device of claim 13, wherein the average value is a moving average and the specified deviation is a fraction of the average value.

* * * * *